June 1, 1965   F. W. NELSON   3,186,750
SHIELD FOR A SCOOP SHOVEL
Filed Oct. 11, 1963
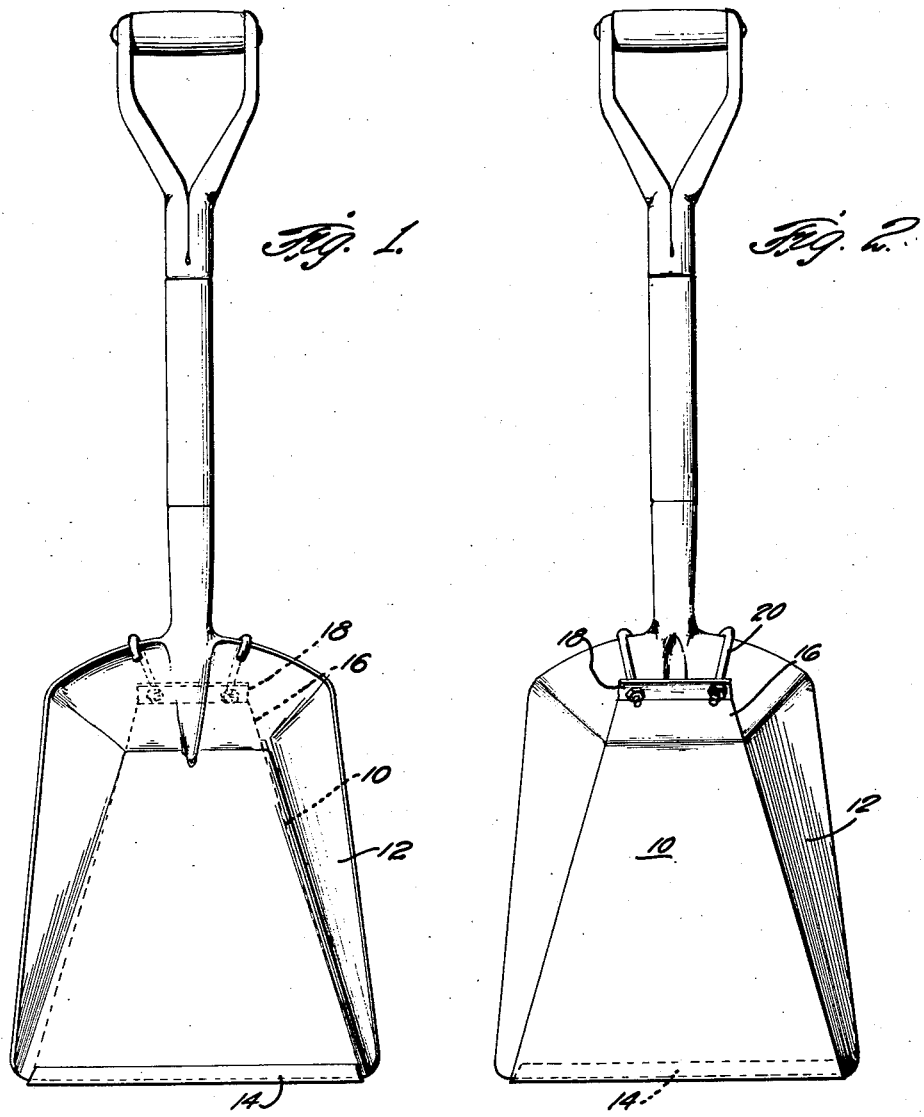
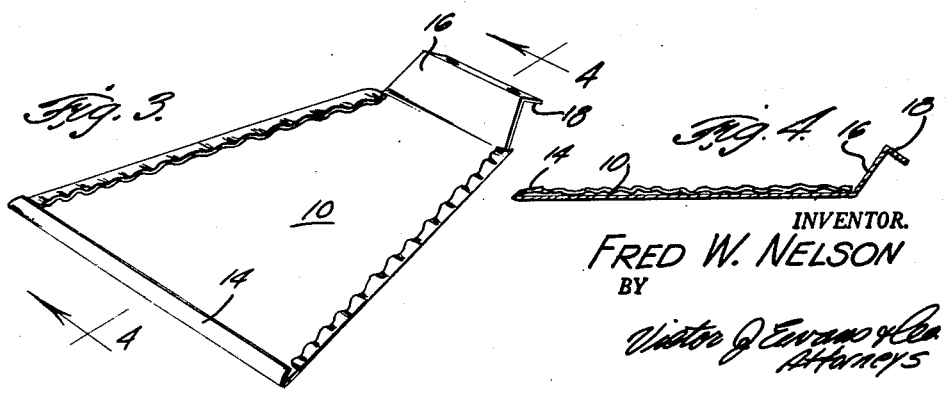
INVENTOR.
FRED W. NELSON
BY 3,186,750
SHIELD FOR A SCOOP SHOVEL
Fred W. Nelson, 18 S. Cherry St., Princeton, Ill.
Filed Oct. 11, 1963, Ser. No. 315,559
3 Claims. (Cl. 294—56)

The present invention relates to hand tools generally and in particular to a shield for protecting the edge and bottom of a scoop shovel.

It has been found that scoop shovels when manufactured from aluminum or other lightweight materials tend to wear out along the edge and bottom from contact with concrete, hard ground, and the like. The abrasive action of the concrete wears through the bottom of the shovel while the edge of the shovel becomes bent over and damaged by constant contact with hard materials.

An object therefore of the present invention is to provide a protective shield for the bottom and forward edge of a scoop shovel so that the scoop shovel may be given a longer period of usefulness.

Another object of the present invention is to provide a scoop shovel with a tightly fitting bottom reinforcement so that if the scoop shovel becomes worn through or perforated it may still be employed in the usual manner.

These and other objects and advantages of the present invention will be fully apparent from the description when taken in connection with the annexed drawing, in which:

FIGURE 1 is a front elevational view of a scoop shovel showing in dotted lines the attachment of the shield of the present invention, FIGURE 2 is a rear elevational view, FIGURE 3 is a perspective view of the shield detached from the shovel, and FIGURE 4 is a view in section taken on the line 4—4 of FIGURE 3.

Referring in detail to the drawing in which like numerals indicate like parts throughout the several views, the shield of the present invention comprises a sheet of rigid metal such as stainless steel or the like and having a main portion 10 conformably shaped to the shape of the bottom of a scoop shovel 12 as shown most clearly in FIGURE 2. One end of the sheet is bent backwardly upon itself to form a lip 14 which when the shield is attached to the shovel 12 extends over the forward or free edge of the shovel 12 as shown in FIGURE 1.

The sheet is also formed with an upwardly and outwardly bent neck portion 16 terminating in a second outwardly and downwardly bent fastening portion 18 through which extend the shanks of hook bolts 20 as shown in FIGURE 2. The hook ends of the bolts 20 extend over the neck of the shovel 12 and secure the sheet with the portion 10 lying flat against the bottom of the shovel 12 and reinforcing the same while the lip 14 reinforces and guards the shovel 12 as shown most clearly in FIGURE 1.

Preferably the side edges of the sheet are bent inwardly and crimped down upon the sheet as shown in exaggerated form in FIGURE 3 so as to make the sheet rigid and to hold the sheet tightly against the bottom of the shovel 12 so that no material being shoveled may enter the space between the sheet main portion 10 and the shovel 12.

It will be seen that the main objects of the invention have been obtained and while it is suggested that stainless steel be employed for the shield of the present invention other materials may be employed as well and the numerous changes and modifications may be made in the shield to adapt it for shovels of other sizes or shapes without departing from the spirit of the invention as set forth in the appended claims.

What is claimed is:

1. A shield for the edge and bottom of a scoop shovel comprising a sheet of rigid material having a main portion conformably shaped to the bottom of a scoop shovel, an end portion folded back over the main portion to form a V-shaped groove adapted to receive the free edge portion of a scoop shovel, and means on the other end of said sheet for attaching said sheet to the neck of a shovel, said sheet having side edges being bent inwardly and crimped downwardly upon the main portion to make the sheet rigid and enabling the sheet to be retained tightly against the bottom of a shovel.

2. A shield for the edge and bottom of a scoop shovel comprising a sheet of rigid material having a main portion conformably shaped to the bottom of a scoop shovel, an end portion folded back over the main portion to form a V-shaped groove adapted to receive the free edge portion of a scoop shovel, the other end of said sheet having a first portion bent so as to lie in a plane inclined with respect to the main portion and lying on the same side of the main portion as the end portion, and a second portion bent to project from the first portion in a plane reversely inclined thereto, and means on said second portion for attaching said sheet to the neck of a shovel, said sheet having side edges being bent inwardly and crimped downwardly upon the main portion to make the sheet rigid and enabling the sheet to be retained tightly against the bottom of a shovel.

3. A shield for the edge and bottom of a scoop shovel comprising a sheet of rigid material having a main portion conformably shaped to the bottom of a scoop shovel, an end portion folded back over the main portion to form a V-shaped groove adapted to receive the free edge portion of a scoop shovel, the other end of said sheet having a first portion bent so as to lie in a plane inclined with respect to the main portion and lying on the same side of the main portion as the end portion, and a second portion bent to project from the first portion in a plane reversely inclined thereto, and hooks extending through said second portion and adapted to engage the neck of a scoop shovel, said sheet having side edges being bent inwardly and crimped downwardly upon the main portion to make the sheet rigid and enabling the sheet to be retained tightly against the bottom of a shovel.

References Cited by the Examiner

UNITED STATES PATENTS

| 348,794 | 9/86 | Smith | 294—51 |
| 1,307,328 | 6/19 | Van Valkenburg | 294—59 X |

SAMUEL F. COLEMAN, *Primary Examiner.*
ERNEST A. FALLER, Jr., *Examiner.*